United States Patent
Chen

(10) Patent No.: US 11,635,350 B2
(45) Date of Patent: Apr. 25, 2023

(54) DIAGNOSTIC SYSTEM AND METHOD FOR DETECTING INTERNAL COMBUSTION ENGINE FAULTS USING EXHAUST PRESSURE READINGS

(71) Applicants: Tula Technology, Inc., San Jose, CA (US); Cummins Inc., Columbus, IN (US)

(72) Inventor: Shikui Kevin Chen, Leander, TX (US)

(73) Assignees: Tula Technology, Inc., San Jose, CA (US); Cummins Inc., Columbus, IN (US)

( * ) Notice: Subject to any disclaimer, the term of this patent is extended or adjusted under 35 U.S.C. 154(b) by 0 days.

(21) Appl. No.: 17/862,143

(22) Filed: Jul. 11, 2022

(65) Prior Publication Data

US 2022/0341819 A1    Oct. 27, 2022

Related U.S. Application Data

(63) Continuation of application No. 17/469,357, filed on Sep. 8, 2021, now Pat. No. 11,415,483, which is a continuation of application No. 17/098,694, filed on Nov. 16, 2020, now Pat. No. 11,143,575.

(60) Provisional application No. 62/980,821, filed on Feb. 24, 2020.

(51) Int. Cl.
*G01M 15/10* (2006.01)
*F02D 17/02* (2006.01)

(52) U.S. Cl.
CPC .......... *G01M 15/106* (2013.01); *F02D 17/02* (2013.01)

(58) Field of Classification Search
CPC .. G01M 15/106; G01M 15/102; G01M 15/11; F02D 17/02; F02D 41/0007; F02D 41/0087; F02D 41/1448; F02D 41/221; F02D 2200/1015; F02M 26/49
See application file for complete search history.

(56) References Cited

U.S. PATENT DOCUMENTS

| | | |
|---|---|---|
| 7,577,511 B1 | 8/2009 | Tripathi et al. |
| 7,849,835 B2 | 12/2010 | Tripathi et al. |
| 7,886,715 B2 | 2/2011 | Tripathi et al. |
| 7,908,913 B2 | 3/2011 | Cinpinski et al. |
| 7,954,474 B2 | 6/2011 | Tripathi et al. |
| 8,006,670 B2 | 8/2011 | Rollinger et al. |
| 8,099,224 B2 | 1/2012 | Tripathi et al. |

(Continued)

FOREIGN PATENT DOCUMENTS

| | | |
|---|---|---|
| CN | 101749132 A | 6/2010 |
| CN | 102192018 A | 9/2011 |

(Continued)

OTHER PUBLICATIONS

International Search Report and Written Opinion dated Mar. 2, 2021 from International Application No. PCT/US2020/060754.

(Continued)

*Primary Examiner* — George C Jin
(74) *Attorney, Agent, or Firm* — Beyer Law Group LLP

(57) ABSTRACT

A diagnostic system and method that (a) that uses models indicative of both successful firing and skips to determine if cylinders of a skip fire controlled internal combustion engine have successfully fired or successfully skipped and (b) uses filtered exhaust gas pressure readings for detecting faults associated with EGR systems and/or turbocharger systems.

30 Claims, 9 Drawing Sheets

(56) References Cited

U.S. PATENT DOCUMENTS

| | | |
|---|---|---|
| 8,131,445 B2 | 3/2012 | Tripathi et al. |
| 8,131,447 B2 | 3/2012 | Tripathi et al. |
| 8,464,690 B2 | 6/2013 | Yuille et al. |
| 8,616,181 B2 | 12/2013 | Sahandiefanjani et al. |
| 8,651,091 B2 | 2/2014 | Tripathi et al. |
| 8,839,766 B2 | 9/2014 | Serrano |
| 8,869,773 B2 | 10/2014 | Tripathi et al. |
| 9,020,735 B2 | 4/2015 | Tripathi et al. |
| 9,086,020 B2 | 7/2015 | Pirjaberi et al. |
| 9,120,478 B2 | 9/2015 | Carlson et al. |
| 9,175,613 B2 | 11/2015 | Parsels et al. |
| 9,200,575 B2 | 12/2015 | Shost |
| 9,200,587 B2 | 12/2015 | Serrano |
| 9,291,106 B2 | 3/2016 | Switkes et al. |
| 9,316,565 B2 | 4/2016 | Kappaganthu et al. |
| 9,399,963 B2 | 7/2016 | Loucks et al. |
| 9,399,964 B2 | 7/2016 | Younkins et al. |
| 9,494,088 B1 | 11/2016 | Serrano et al. |
| 9,512,794 B2 | 12/2016 | Serrano et al. |
| 9,689,327 B2 | 6/2017 | Younkins et al. |
| 9,835,522 B2 | 12/2017 | Chen et al. |
| 9,890,732 B2 | 2/2018 | Younkins et al. |
| 9,891,137 B2 | 2/2018 | Chen et al. |
| 9,945,313 B2 | 4/2018 | Kotwicki et al. |
| 9,995,652 B1 | 6/2018 | Chen |
| 10,247,072 B2 | 4/2019 | Younkins et al. |
| 10,253,706 B2 | 4/2019 | Kotwicki et al. |
| 10,337,428 B2 | 7/2019 | Oh et al. |
| 10,947,917 B2 | 3/2021 | Ottikkutti et al. |
| 11,143,575 B2 | 10/2021 | Chen |
| 11,326,528 B2 | 5/2022 | Rollinger et al. |
| 2007/0277778 A1 | 12/2007 | Eser et al. |
| 2011/0144888 A1 | 6/2011 | Rollinger et al. |
| 2014/0069377 A1 | 3/2014 | Brennan et al. |
| 2016/0003169 A1 | 1/2016 | Leone et al. |
| 2017/0101956 A1* | 4/2017 | Younkins ............ F02D 41/1401 |
| 2017/0370804 A1 | 12/2017 | Chen et al. |
| 2018/0171937 A1 | 6/2018 | Shelby et al. |
| 2018/0238248 A1 | 8/2018 | Karnik et al. |
| 2018/0274436 A1* | 9/2018 | Kemmerling ......... F02B 37/162 |
| 2019/0264594 A1* | 8/2019 | Anderson ................ F01N 9/00 |
| 2020/0025050 A1 | 1/2020 | Chen et al. |
| 2021/0003088 A1 | 1/2021 | Chen et al. |
| 2021/0262896 A1 | 8/2021 | Chen |
| 2021/0404912 A1 | 12/2021 | Chen |

FOREIGN PATENT DOCUMENTS

| | | |
|---|---|---|
| CN | 107489536 A | 12/2017 |
| CN | 110462187 A | 11/2019 |
| KR | 1020160085563 | 7/2016 |
| WO | WO 2010/006311 | 1/2010 |
| WO | WO 2011/085383 | 7/2011 |
| WO | WO 2015/179119 | 11/2015 |

OTHER PUBLICATIONS

Chinese Office Action dated Sep. 30, 2022 from Chinese Application No. 202080085030.0.

* cited by examiner

DIAGNOSTIC SYSTEM AND METHOD FOR DETECTING INTERNAL COMBUSTION ENGINE FAULTS USING EXHAUST PRESSURE READINGS

CROSS REFERENCE TO RELATED APPLICATIONS

This application is a continuation of U.S. application Ser. No. 17/469,357 filed Sep. 9, 2021, which is a continuation of U.S. application Ser. No. 17/098,694, filed Nov. 16, 2020 (now U.S. Pat. No. 11,143,575, issued Oct. 12, 2021), which claims priority of U.S. Provisional Application No. 62/980,821, filed Feb. 24, 2020, all of which are incorporated by reference herein for all purposes.

BACKGROUND

The present invention relates generally to a diagnostic system and method for detecting internal combustion engine faults, and more particularly, to (a) using models indicative of both successful firing and skips to determine if cylinders of a skip fire controlled internal combustion engine have successfully fired or successfully skipped and (b) using filtered exhaust gas pressure readings for detecting faults in valves associated with Exhaust Gas Recirculation (EGR) systems and/or turbocharger systems.

Most vehicles in operation today are powered by internal combustion (IC) engines. Internal combustion engines typically have a plurality of cylinders where combustion occurs. Under normal driving conditions, the torque generated by an internal combustion engine varies over a wide range in order to meet the operational demands of the driver. In situations when full torque is not needed, the fuel efficiency of many types of internal combustion engines can be substantially improved by dynamically varying the displacement of the engine. The most common method of varying engine displacement is deactivating a group of one or more cylinders. For example, with a six cylinder engine, a group of two, three, or four cylinders may be deactivated. Another engine control approach that varies the effective displacement of an engine is referred to as skip fire engine control. In general, skip fire engine control contemplates selectively firing cylinders during some firing opportunities, while selectively skipping the firing of cylinders during other firing opportunities. Thus, a particular cylinder may be fired, skipped and either fired or skipped over three successive working cycles.

In both variable displacement and skip fire controlled engines a skip cylinder may be deactivated such that either or both the cylinder's intake and exhaust valve remain closed during a skipped working cycle. A deactivated working cycle pumps little or no air through the engine on a skipped working cycle, which generally improves engine efficiency and increases temperature of the engine's exhaust gases.

The use of pressure sensors in both the intake manifold and the exhaust manifold of various types of internal combustion engines is known for a variety of diagnostic reasons. For example, in U.S. Pat. Nos. 9,995,652, 9,891,137 and 9,835,522 pressure sensor(s) located in the intake manifold are used to help determine if induction faults have occurred with the intake valves during the working cycles of the cylinders. U.S. Pat. No. 9,890,732 discloses the use of exhaust pressure sensor(s) that are used to help detect the misfiring of working cycles of cylinders and/or faults in the operation of the exhaust valves of the cylinders. U.S. Pat. No. 9,316,565 discloses a cylinder misfire detection system that relies on changes in exhaust pressure fluctuations, compares the fluctuations with a diagnostic threshold and determines if a cylinder misfire has occurred based on the comparison. In US Patent Publication 2011/0144888, a cylinder valve monitoring system for a reduced displacement controlled engine is disclosed. When a cylinder is deactivated, the valve monitoring system is used to determine if corresponding intake and/or exhaust valves either properly closed (i.e., deactivated) or improperly opened by comparing a measured exhaust pressure to a threshold. The threshold is determined based on current engine and ambient operating conditions, adjusted based on a sliding window of previous combustion events or cycles, and/or by mathematical or statistical techniques. If the measured pressure exceeds the threshold, then a determination is made that a valve fault occurred and improperly opened.

None of the above listed prior art references, however, are directed to an engine diagnostic system and method (a) that uses models indicative of both successful firing and skips to determine if cylinders of a skip fire controlled internal combustion engine have successfully fired or successfully skipped and (b) uses filtered exhaust gas pressure readings for detecting faults in valves associated with EGR systems and/or turbocharger systems.

SUMMARY

The present application is directed toward a diagnostic system and method that (a) uses models indicative of both successful firing and skips to determine if cylinders of a skip fire controlled internal combustion engine have successfully fired or successfully skipped and (b) uses filtered exhaust gas pressure readings for detecting faults in valves associated with EGR systems and/or turbocharger systems.

In one non-exclusive embodiment, the present invention is directed to a method that involves generating first and second models of exhaust pressures for a cylinder of an internal combustion engine that is (a) successfully fired and (b) successfully skipped respectively, issuing commands to either fire or skip the cylinder during a working cycle of the internal combustion engine and determining if the cylinder successfully fired or skipped by comparing a measured exhaust pressure with (a) the first model if the command was to fire the cylinder during the working cycle and (b) the second model if the command was to skip the cylinder during the working cycle.

In another non-exclusive embodiment, the present invention is directed to a system that includes an internal combustion engine having a plurality of cylinders and a skip fire engine controller arranged to operate the cylinders of the internal combustion engine in a skip fire manner, the skip fire operation involving firing the cylinders during some working cycles and skipping the cylinders during other working cycles. The system further includes a storage unit arranged to store (a) a first model of exhaust pressures indicative of successful firings of the cylinders of the internal combustion engine and (b) a second model of exhaust pressures indicative of successful skips of the cylinders of the internal combustion engine. The system also includes a fault detection system arranged to generate fault signals for working cycles of cylinders that were either unsuccessfully fired or unsuccessfully skipped by comparing a measured exhaust pressure with (a) the first model for fire commands and (b) the second model for skip commands.

In yet another non-exclusive embodiment, the present invention is directed to another system that includes an internal combustion engine having a plurality of cylinders and a skip fire engine controller arranged to operate the cylinders of the internal combustion engine in a skip fire manner, the skip fire operation involving firing the cylinders during some working cycles and skipping the cylinders during other working cycles. The system further includes a fault detection system arranged to (a) filter a measured exhaust pressure signal over multiple working cycles of the plurality of cylinders and (b) generate a diagnostic fault signal if the filtered measured exhaust pressure signal falls below a threshold pressure.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present application is directed to an engine diagnostic system and method that includes a fault detection system (a) that uses models indicative of both successful firings and skips to determine if cylinders of a skip fire controlled internal combustion engine have successfully fired or successfully skipped and (b) that uses filtered exhaust gas pressure readings for detecting faults in valves associated with EGR systems and/or turbocharger systems.

Figure 1:
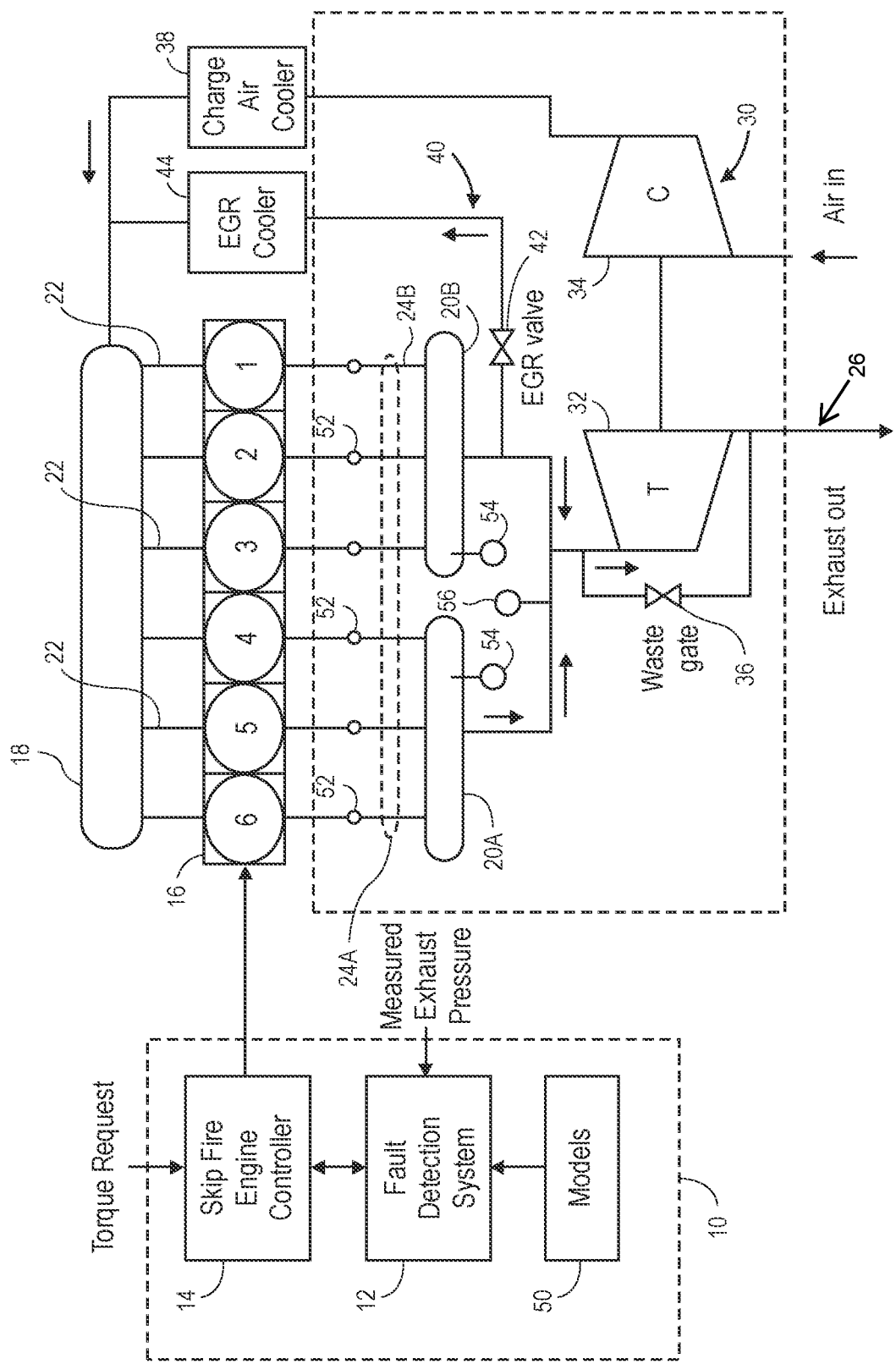
FIG. 1 is a logic diagram of a fault detection system that is used in cooperation with a skip fire controlled internal combustion engine that is optionally used with an Exhaust Gas Recirculation (EGR) system and/or turbo-charging system in accordance with non-exclusive embodiments of the present invention.

Referring to FIG. 1 a logic diagram 10 including a fault detection system 12 that operates in cooperation with a skip fire controller 14 used to control skip fire operation of an internal combustion engine 16 is shown. In the particular embodiment shown, the internal combustion engine has six cylinders. The internal combustion engine 16 operates in cooperation with an air intake manifold 18 and one or more exhaust manifolds 20A and 20B.

The Internal Combustion Engine

In the particular embodiment shown, the internal combustion engine has six in-line cylinders or working chambers, labeled in the drawing 1, 2, 3, 4, 5 and 6 respectively. With six cylinders, six air input runners 22 are provided between the air intake manifold 18 and each of the six cylinders respectively. The individual air input runners 22 are provided to supply air and potentially other gases for combustion from the input manifold 18 to the individual cylinders respectively. In the particular embodiment shown, two exhaust manifolds 20A and 20B are provided to direct combusted gases from the cylinders to an exhaust system 26. In particular, three exhaust runners 24A are provided between cylinders 6, 5 and 4 and the first of the two exhaust manifolds 20A and an additional three exhaust runners 24B are provided between the cylinders 3, 2 and 1 and the second of the two exhaust manifolds 20B. The exhaust manifolds 20A and 20B both exhaust to the exhaust system 26.

In various embodiments, the exhaust system 26 may include any number of various aftertreatment systems, including but not limited to a Diesel particulate filter, a Selective Catalytic Reduction (SCR) system, a Diesel Exhaust Fluid (DEF) system and/or a NOx trap which are generally used for Diesel or lean burn internal combustion engines and/or a three-way catalytic converter, which is typically used for a gasoline-fueled, spark ignition, internal combustion engine.

It should be understood that the particular configuration of the internal combustion engine 16, the intake manifold 18 and the two manifolds exhaust manifolds 20A and 20B is merely exemplary. In actual embodiments, the number of cylinders and the number and/or arrangement of the cylinders may widely vary. For example the number of cylinders may range from one to any number, such as 3, 4, 5, 6, 8, 12 or 16 or more. Also, the cylinders may be arranged in-line as shown, in a V configuration, in multiple cylinder banks, etc. The internal combustion engine may be a Diesel engine, a lean burn engine, a gasoline-fueled engine, a spark ignition engine, or a multi-fuel engine. The engine may also use any combination of ignition source, fuel-stratification, air/fuel stoichiometry, or combustion cycle. Also, on the exhaust side, varying numbers of exhaust manifolds may be used, ranging from just one shared by all cylinders or multiple exhaust manifolds.

Most internal combustion engines, including both gasoline-fueled and Diesel-fueled, have an intake manifold for supplying air to the cylinders needed for combustion and an exhaust manifold for directing combusted gases from the cylinders to an exhaust system. Depending on the type of vehicle, the exhaust system typically includes one or more aftertreatment systems, such as a particulate filter, a reducing catalytic converter, an oxidizing catalytic converter, etc. In some cases, a single aftertreatment element may perform multiple functions, such as a 3-way catalyst that can both oxidize and reduce noxious tail pipe emissions.

Turbocharger and/or Exhaust Gas Recirculation (EGR) Systems

Also included in the particular embodiment shown, the internal combustion engine 16 can optionally be used with either or both a turbocharger 30 and/or an Exhaust Gas Recirculation (EGR) system 40.

The turbocharger 30 is used to boost the pressure in the intake manifold 18 above atmospheric pressure. With boosted air, the internal combustion engine 16 can generate more power compared to a naturally aspirated engine because more air, and proportionally more fuel, can be input into the individual cylinders.

The optional turbocharger 30 includes a turbine 32, a compressor 34, a waste gate valve 36 and an air charge cooler 38. The turbine 32 receives combusted exhaust gases from one or more of the exhaust manifold(s) 20A and/or 20B. In situations where more than two exhaust manifolds are used, their outputs are typically combined to drive the turbine 32. The exhaust gases passing through the turbine drives the compressor 34, which in turn, boosts the pressure of air provided to the air charge cooler 38. The air charge cooler 38 is responsible for cooling the compressed air to a desired temperature or temperature range before re-circulating back into the air intake manifold 18.

In some optional embodiments, a waste gate valve 36 may be used. By opening the waste gate valve 36, some or all of the combusted exhaust gases from the exhaust manifold(s) 20 can bypass the turbine 32. As a result, the back-pressure supplied to the fins of the turbine 32 can be controlled, which in turn, controls the degree to which the compressor 34 compresses the input air eventually supplied to the intake manifold 18.

In various non-exclusive embodiments, the turbine 32 may use a variable geometry subsystem, such as a variable vane or variable nozzle turbocharger system. In which case, an internal mechanism (not shown) within the turbine 32 alters a gas flow path through the fins of the turbine to optimize turbine operation as the exhaust gas flow rate through the turbine changes. If the turbine 32 is part of a variable geometry or variable nozzle turbocharger system, the waste gate 36 may not be required.

The EGR system 40 includes an EGR valve 42 and an EGR cooler 44. The EGR valve 42 is fluidly coupled to one or more of the exhaust manifolds 20A and/or 20B and is arranged to provide a controlled amount of the combusted exhaust gases to the EGR cooler 44. In turn, the EGR cooler 44 cools the exhaust gases before re-circulating the exhaust gases back into the intake manifold 18. By adjusting the position of the EGR valve 42 the amount of exhaust gas re-circulated into the intake manifold 18 is controlled. The more the EGR valve 42 is opened, the more exhaust gas flows into the intake manifold 18. Conversely, the more the EGR valve 42 is closed, the less exhaust gas is re-circulated back into the intake manifold 18.

The recirculation of a portion of the exhaust gases back into the internal combustion engine 16 acts to dilute the amount of fresh air supplied by the intake runners 22 to the cylinders. By mixing the fresh air with gases that are inert to combustion, the exhaust gases act as absorbents of combustion generated heat and reduce peak temperatures within the cylinders. As a result, $NO_x$ emissions are typically reduced.

Skip Fire Engine Control

The skip fire engine controller 14 is responsible for skip fire operation of the internal combustion engine 16. During operation, the skip fire controller 14 receives a torque request. In response, the skip fire engine controller 14 selects a firing pattern or fraction for the cylinders to meet the requested torque. As the torque demand changes, the firing pattern or firing fraction changes accordingly. Thus, for a given firing fraction pattern, skip fire engine control contemplates selectively firing cylinders during some firing opportunities, while selectively skipping the firing of other cylinders during other firing opportunities.

The skip fire engine controller 14 may operate using a defined set of firing patterns or firing fractions over certain ranges of engine speed and torque requests. Each firing pattern/fraction has a corresponding effective engine displacement. Often the set of firing patterns/fractions that are supported is relatively limited—for example—a particular engine may be limited to using firing fractions of ⅓, ½, ⅔ and 1. Other skip fire controllers facilitate the use of significantly more unique firing patterns or fractions. By way of example, some skip fire controllers designed by the Applicant facilitate operation at any firing fraction between zero (0) and one (1) having an integer denominator of nine (9) or less. Such a controller has a set of 29 potential firing fractions, specifically: 0, ⅑, ⅛, ⅐, ⅙, ⅕, 2/9, ¼, 2/7, ⅓, ⅜, ⅖, 3/7, 4/9, ½, 5/9, 4/7, ⅗, ⅝, ⅔, 5/7, ¾, 7/9, ⅘, ⅚, 6/7, ⅞, 8/9 and 1. Although 29 potential firing fractions may be possible, not all firing fractions are suitable for use in all circumstances. Rather, at any given time, there may be a much more limited set of firing fractions that are capable of delivering the desired engine torque while satisfying manufacturer imposed drivability and noise, vibration and harshness (NVH) constraints. An engine's firing pattern or firing fraction may also be expressed as an effective operational displacement, which indicates the average displacement of the engine used to generate torque by combustion of fuel under the current operating conditions.

In general, skip fire engine control facilitates finer control of the effective engine displacement than is possible using a conventional variable displacement approach. For example, firing every third cylinder in a 4-cylinder engine would provide an effective displacement of $⅓^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. The Applicant has filed a number of patents describing various approaches to skip fire control. By way of example, U.S. Pat. Nos. 7,849,835; 7,886,715; 7,954,474; 8,099,224; 8,131,445; 8,131,447; 8,464,690; 8,616,181; 8,651,091; 8,839,766; 8,869,773; 9,020,735; 9,086,020; 9,120,478; 9,175,613; 9,200,575;

9,200,587; 9,291,106; 9,399,964; 9,689,327; 9,512,794; and 10,247,072 and others, describe a variety of engine controllers that make it practical to operate a wide variety of internal combustion engines in a skip fire operational mode. Each of these patents is incorporated herein by reference.

Many of these patents relate to dynamic skip fire control in which firing decisions regarding whether to skip or fire a particular cylinder during a particular working cycle are made in essentially real time. That is, the fire/skip decision for a given cylinder is made just prior to the start of the next working cycle for that cylinder (i.e., on an individual cylinder firing opportunity by firing opportunity basis) or on an engine cycle-by-engine cycle basis.

The application of skip fire engine control, including DSF, to lean burn internal combustion engines, such as Diesel engines, is also known. See for example U.S. Pat. No. 10,247,072 and U.S. application Ser. No. 16/576,972 assigned to the assignee of the present application, and which is incorporated by reference herein for all purposes. As described in the patent and application, engine control is used to improve the efficiency of the engine exhaust system by controlling the temperature of exhaust gases. By using DSF to selectively determine a firing density and a pumping density, the temperature of combusted exhaust gases can be controlled within a preferred range. By controlling the temperature of combusted exhaust gases, the efficiency of the aftertreatment systems in the exhaust system is improved, reducing emissions.

Fault Detection System

The fault detection system 12 is a diagnostic tool that performs at least two diagnostic operations. First, the fault detection system uses models, which are maintained in an accessible storage location 50, indicative of both successful cylinder firings and successful cylinder skips to determine if the six cylinders 1-6 of the internal combustion engine 16 have successfully fired or successfully skipped per commands from the skip fire engine controller 14. Second, the fault detection system is arranged to generate and use a filtered exhaust gas pressure readings for detecting faults in the turbocharger system 30 and/or the EGR valve of the EGR system 40 if optionally used.

Exhaust Pressure Sensor(s) and Locations

The fault detection system 12 relies on one or more exhaust pressure sensor(s) that are used to measure exhaust pressure. In accordance with various embodiments, the exhaust pressure sensor(s) may be provided at a number of different locations. For example, an exhaust pressure sensor 52 may be provided on each exhaust runner 24 for each cylinder of the internal combustion engine 16. In another embodiment, an exhaust pressure sensor 54 may be provided within the exhaust manifolds 20. For instance, in the particular embodiment illustrated in FIG. 1, two exhaust pressure sensors 54 are provided for each of the exhaust manifolds 20A and 20B respectively. In yet another embodiment, one exhaust pressure sensor 56 is provided downstream from the exhaust manifolds 20A and 20B. It should be noted that the exhaust pressure sensors 52, 54 and 56, provided in three different locations in FIG. 1, are intended to be merely illustrative and are by no means a requirement. In most actual or real-world embodiments, typically just one of the three locations would be used. Having exhaust pressure sensors at two or all three locations is typically not necessary, but could be implemented if desired.

There are advantages and disadvantages with each of the above-mentioned exhaust pressure sensor locations. Runner based exhaust pressure sensors 52 offer several advantages. Initially, since exhaust valves of the cylinders exhaust directly into the exhaust runners 24, the position of the pressure sensors 52 allow exhaust events to be detected more quickly compared to the down-stream pressure sensors. As a result, potential faults can be detected sooner. In addition, the pressure signal generated by the pressure sensors 52 tend to be "cleaner" and carry more information compared to similar signals from pressure sensors located downstream for a number of reasons, including (a) less damping of the pressure wave due to their proximity to the cylinders and (b) individual cylinder runners generally experience less influence from other cylinders than components located further downstream. The cleaner signal is particularly useful when trying to identify other exhaust valve faults that are more subtle than a total failure of an exhaust valve to either open or close after a fire or skip event. Such other faults include valve lift faults where the valve does not lift the desired amount, valve timing faults where the timing of the opening and closing of the exhaust valve varies from the intended time, and failure to deactivate faults associated with skipped firing opportunities.

With runner based pressure sensors 52, one is needed for each cylinder. The main drawback of runner based exhaust pressure sensors 52 is therefore mainly cost and complexity.

Conversely, downstream sensors 54 and 56 tend to produce signals that are less clean and carry less information. As a result, the ability to detect faults when these sensors are used is likely to be less accurate and potentially slower. The advantage, however, of using sensors located only within the exhaust manifold(s) 20A and 20B and/or downstream of the exhaust manifolds is that typically fewer sensors are needed. Costs and complexity are therefore reduced.

Exhaust Gas Pressure Fluctuations

When a cylinder successfully fires, combustion of an air-fuel mixture occurs during the power stroke of the working cycle as the piston moves from Top Dead Center (TDC) to Bottom Dead Center (BDC). As is well known in the art with Diesel engines, pressure and heat causes the combustion, while a spark is used for ignition with gasoline-fueled engines. With either type of engine, the hot, combusted gases are exhausted from the working chamber of the cylinder during the exhaust stroke. When the piston reaches BDC, the exhaust valve(s) of the cylinder are opened and the piston moves toward TDC. As a result, the combustion gases are forced out or expelled from the cylinder, causing a surge of the hot, combusted, gases into the corresponding exhaust runner 24 and to pass through exhaust manifold 20A and 20B.

If a cylinder commanded to fire misfires, however, little to no combustion occurs during the power stroke. As a result, there is little to no surge in pressure during the exhaust stroke in the corresponding exhaust runner 24 and exhaust manifold 20A or 20B as compared to a successful firing.

With skips, the complement of the above occurs. With a successful skip, there is no combustion and the exhaust valve is typically deactivated. As a result, little to no surge in pressure passes through the corresponding exhaust runner 24 and exhaust manifold 20. With unsuccessful skips, however, the exhaust valve may partially or fully open, and in addition, some combustion may occur depending on the nature of the failure. Either way, there will typically be some surge in the pressure in the exhaust systems as either air is pumped through the cylinder and/or some combusted gases are exhausted.

The measured pressure of a successful firing during a working cycle is therefore essentially a pulse. If the firing was unsuccessful, then there will be little to no pulse. On the other hand with successful skips, there is little to no pulse, but with unsuccessful skips, there is typically a pulse of some magnitude. In each case, these pressure fluctuations can be measured by any of the pressure sensors 52, 54 and/or 56. Thus, from the measured pressure readings, the in-cylinder pressure just prior to the exhaust valve opening can be estimated. From the estimated pressure reading, a determination can be made (1) if a combustion event occurred or not and (2) if a combustion event occurred, what was the work output. With this information, a determination can be made if the cylinder successfully implemented or not a fire command or a skip command.

Figure 2A:
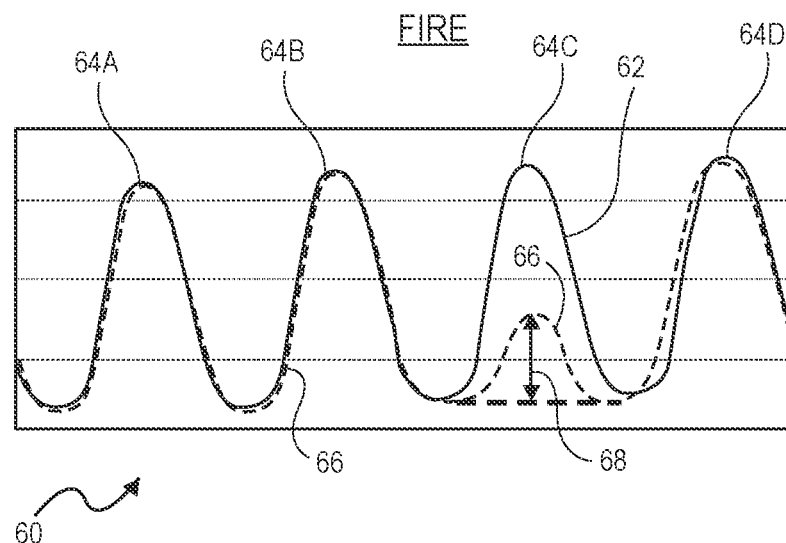
FIG. 2A is an exemplary plot of expected exhaust gas pressure fluctuations over several working cycles showing several successful cylinder firings and an unsuccessful firing (e.g., an unexpected skip).

Referring to FIG. 2A, an exemplary plot 60 of expected exhaust gas pressure fluctuations over several working cycles is shown. In this particular plot, the solid line 62 shows the expected exhaust gas pressure pulses over four fired working cycles, each labeled 64A, 64B, 64C and 64D respectively. The dashed line 66 shows the actual pressure as measured by any of the sensors 52, 54 or 56. In this particular example, the measured pressure fluctuations or pulses 66 closely tracks the expected exhaust gas fluctuations for working cycles 64A, 64B and 64D, but not 64C. For working cycle 64C, the magnitude of the pulse, as designated by arrow 68, is much smaller than the other pulses. When the expected and measured signals 62, 66 closely track one another, it is indicative of a successful firing. When they do not, it is indicative of an unsuccessful firing or a misfire. Thus, the plot 60 shows successful firings over working cycles 64A, 64B and 64D, but a misfire for 64C.

The Applicant has noted that the plot 60 may be used for any of the locations noted above with regard to the sensors 52, 54 or 56. However, as noted above, the sensors 54 and 56 tend to produce signals that are less clean and carry less information. In addition, at least with the downstream sensors 54 and/or 56, the exhaust pressure reading of one cylinder event may overlap with the previous or next cylinder event. The Applicant has therefore devised additional optional signal processing steps to help differentiate between exhaust gas pressure readings for successful cylinder firings versus unsuccessful firings (e.g., an unexpected skip or an unexpected valve deactivation) when downstream pressure sensing devices are used.

Figure 2C:
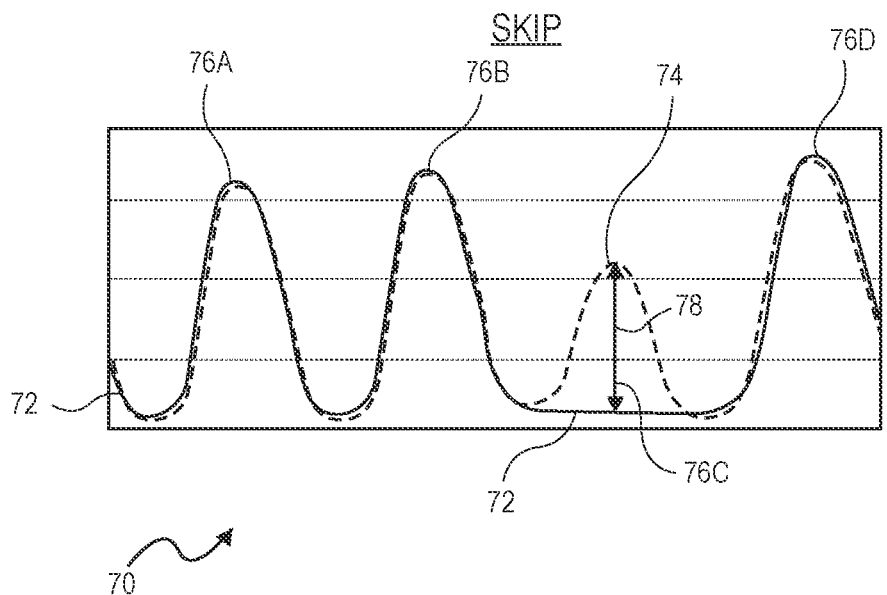
FIG. 2C is an exemplary plot of expected exhaust gas pressure fluctuations over several working cycles showing several successful cylinder skips and an unsuccessful skip.
Figure 2B:
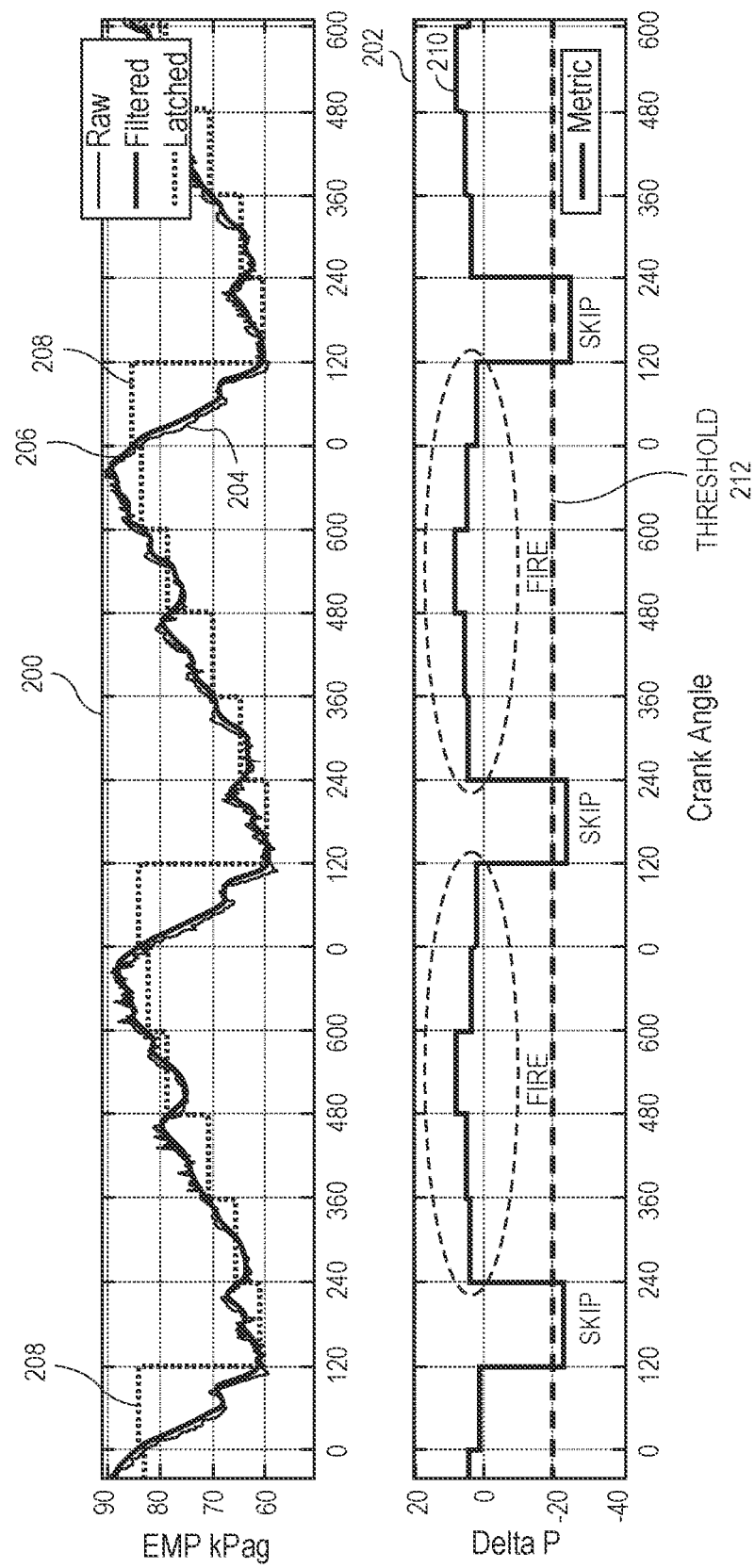
FIG. 2B is another exemplary of a first exemplary plot of expected exhaust gas pressure fluctuations over several working cycles and a second plot showing several successful cylinder firings and an unsuccessful firing after some data processing in accordance with a non-exclusive embodiment of the invention.

Referring to FIG. 2B, a first exemplary plot 200 of expected exhaust gas pressure fluctuations over the working cycles of an exemplary six cylinder engine over and engine cycle and a second plot 202 showing several successful cylinder firings and one unsuccessful firing is shown.

Specifically, the plot 200 shows a "raw" exhaust manifold pressure reading 204 by sensors 54 and/or 56 as measured, in this particular example, from the aforementioned six cylinder engine operating at a firing fraction of ⅚. In other words, one cylinder is skipped and the other five are fired each engine cycle so long as the firing fraction remains unchanged. As can be seen from the exhaust manifold pressure reading 204, the peaks for fires and the valley for the skip are not as distinct or clear as, for example, depicted in FIG. 2A due to signal noise and the exhaust pressure overlap from the prior and next cylinder events. To address this issue, the Applicant proposes:

(1) Generating a filtered version 206 of the exhaust manifold pressure reading 204 by filtering or using a moving average of the raw signal 204. By filtering the raw signal 204, high frequency noise is removed, resulting in a "smoother" signal; (2) Generating a "latched" signal 208 by sampling or latching the filtered version 206 of the raw signal 204 at each cylinder event (i.e., for a six cylinder engine, the filtered version 206 of the exhaust manifold pressure reading is latched every 120° degrees of the crank angle).

In the second plot 202, a "difference" pressure signal 210 is generated by subtracting each latched value from the previous latched value. The difference pressure signal 210 is then plotted versus a threshold pressure value 212. As depicted in the second plot 202, when the difference pressure signal 210 is greater than the threshold pressure value 212, a "fire" is designated, while a "skip" is designated whenever the difference pressure signal 210 falls below the threshold value 212.

In this particular example, the firing fraction is ⅚. As a consequence, five (5) of six (6) cylinder events of the difference pressure signal 210 are above the threshold 212, while one (1) cylinder event is below the threshold 212. If one or more unexpected skips and/or unexpected valve deactivation occurs, then the difference pressure signal 210 will likely fall below the threshold 210, flagging the unexpected event(s).

In one embodiment, the threshold pressure value 212 is determined from empirical data. That is for a given engine, exhaust manifold pressure readings are generated for multiple successful cylinder firings. From these readings, the threshold pressure value 212 can be derived. As a general rule, the larger the data set of successful firings collected, the more accurate the threshold pressure value 212 is likely to be.

It should be understood that the firing fraction or density of ⅚ as discussed herein is merely exemplary. The signal processing as discussed herein may be used to detect unsuccessful fires regardless of the firing fraction.

Referring to FIG. 2C, an exemplary plot 70 of expected exhaust gas pressure fluctuations over several working cycles is shown. In this plot 70, the solid line 72 shows the expected pressure, whereas the measured exhaust pressure is represented by the dashed line 74.

In this example, three successful fired working cycles 76A, 76B and 76D are shown. In each of these cases, the measured pressure 74 closely tracks the expected pressure 72.

Working cycle 76C, however, is indicative of an unsuccessful skip. With a skipped working cycle, the expected pressure 72 is very low because no combustion is expected and the exhaust valve of the skipped cylinder is typically not opened. But with an unsuccessful skip, the measured pressure 74 will be relatively higher, as signified in this example by the arrow 78, which is indicative that some combustion may have occurred and/or the exhaust valve malfunctioned and opened allowing air to pump through the cylinder.

It should be noted that the plots 60, 70 can be interpreted in one of several ways, depending on the location of the pressure sensor(s) used to measure the actual exhaust. For example:

1. If the pressure sensor is one of the sensors 52 located along an exhaust runner 24, then the successive work cycles illustrated in the two plots 60, 70 are indicative of the same cylinder over four successive engine cycles. For example, if the cylinder in question is number 3, then the plots 60, 70 show the measured pressure output of cylinder 3 over four successive engine cycles.

2. On the other hand if the pressure sensor is either one of the pressure sensors 54 located within an exhaust manifold 20A or 20B or the pressure sensor 56 located downstream of the exhaust manifolds 20A, 20B, then the two plots 60, 70 show working cycles of different cylinders operating in their sequence order during one engine cycle.

With both plots 60, 70, the measured pressure as illustrated closely tracks the expected pressure. In actual embodiments, however, depending on which of sensors 52, 54 and/or 56 is used, there may be a time offset between the expected and measured pressure. The farther away the sensor is from the cylinders, the longer it takes for the combusted gases to propagate through the exhaust runners 24 and manifolds 20A, 20B and reach the measuring sensor. As a result, if sensors 52 in the exhaust sensors are used, then the time offset is minimal, but will become larger if sensors 54 or 56 are used. As a general rule, the further away from the cylinders the pressure measurement readings are taken, the larger the time offset.

The Applicant has noted that the plot 70 may be used for any of the locations noted above with regard to the sensors 52, 54 or 56. However, as noted above, the sensors 54 and 56 tend to produce signals that are less clean and carry less information. In addition, the exhaust pressure readings from one cylinder event tend to overlap with the previous and next cylinder events. The Applicant has therefore devised additional optional signal processing steps to help when downstream exhaust gas pressure sensors are used to differentiate readings for successful cylinder skips versus unsuccessful skips (i.e., accidental fires).

Figure 2D:
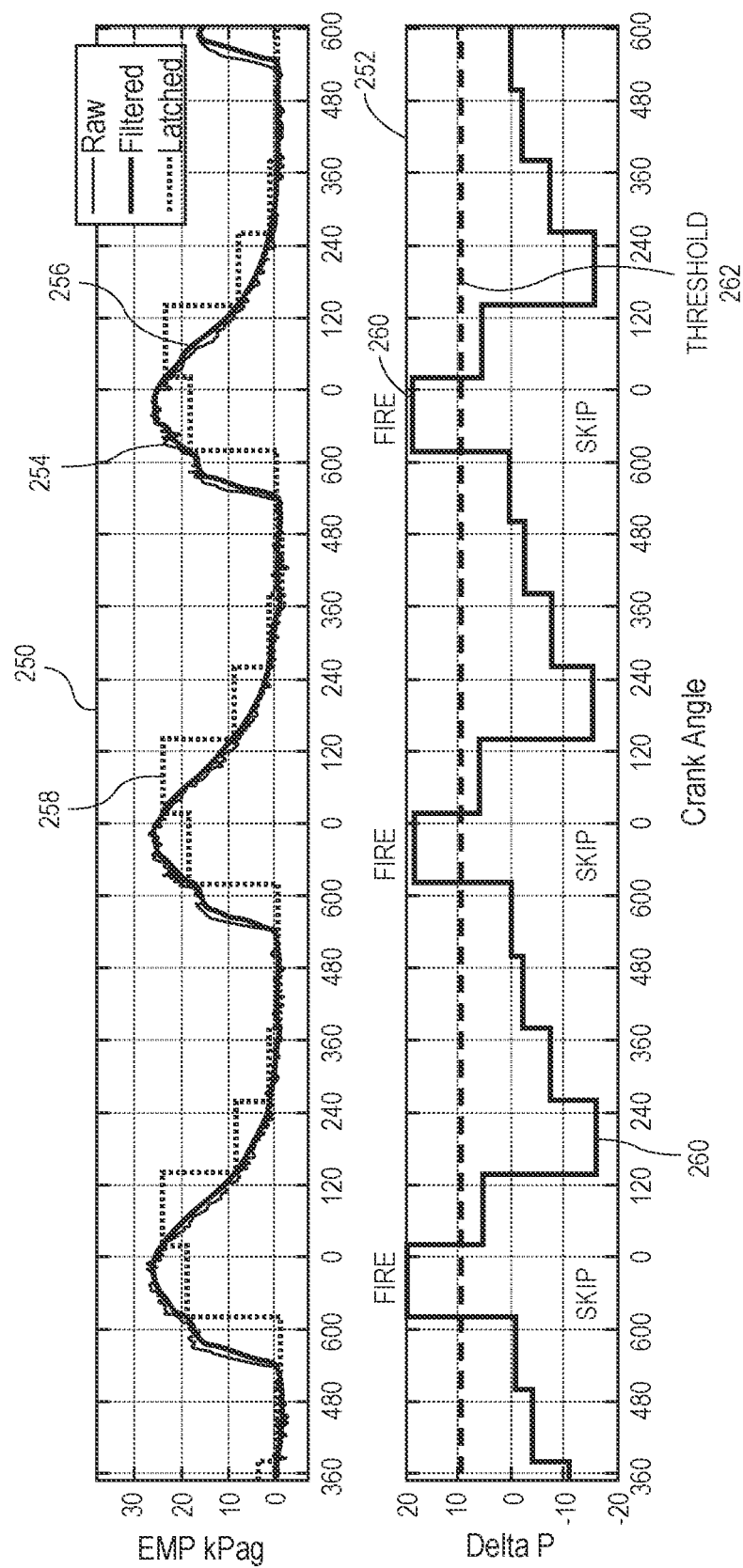
FIG. 2D is another exemplary of a first exemplary plot of expected exhaust gas pressure fluctuations over several working cycles and a second plot showing several successful cylinder skips and an unsuccessful skip after some data processing in accordance with a non-exclusive embodiment of the invention.

FIG. 2D shows a first exemplary plot 250 of expected exhaust gas pressure readings over the working cycles of an engine cycle of a six cylinder engine and a second plot 252 showing several successful cylinder skips and an unsuccessful skip (i.e., an accidental fire) after some data processing of the readings of plot 250.

Specifically, the plot 250 shows "raw" exhaust manifold pressure readings 254 by sensors 54 and/or 56 as measured, in this particular example, during an engine cycle of a six cylinder engine operating at a firing fraction of ⅙. In other words, one cylinder is fired and the other five are skipped each engine cycle so long as the firing fraction remains unchanged. As can be seen from the exhaust manifold pressure reading 254, the valleys for the skips and the peak for the fire are not as distinct or clear as, for example, depicted in FIG. 2C due to signal noise and the overlap of exhaust pressure readings from the prior and/or next cylinder event. To address this issue, the Applicant proposes:

(1) Generating a filtered version 256 of the exhaust manifold pressure reading 254 by filtering by using a moving average of the raw signal 254. By filtering the raw signal 254, high frequency noise is removed, resulting in a "smoother" pressure signal;

(2) Generating a "latched" signal 258 by sampling or latching the filtered version 256 of the raw signal 254 at each cylinder event (i.e., again for a six cylinder engine, the filtered version 256 of the exhaust manifold pressure reading is latched every 120° degrees of the crank angle).

In the second plot 252, a "difference" pressure signal 260 is generated by subtracting for each latched value from the previous latched value. The difference for each subtraction is then plotted, resulting in the difference pressure signal 260.

As depicted in the second plot 252, a fire is designated each time the difference pressure signal 260 is greater than a threshold pressure 262, while a skip is designated whenever the difference pressure signal 260 falls below the threshold pressure 262. Again, the threshold pressure 262 is generated from empirical data indicative of successful fires for a given engine.

In this particular example, the firing fraction is ⅙. As a consequence, one (1) of six (6) cylinder events of the difference pressure signal 260 is ideally above the threshold 262, while five (5) cylinder events are below the threshold 262. If one or more accidental fire(s) occurs, meaning a skip was commanded but the resulting difference pressure signal 260 exceeds the threshold 262, then the cylinder event is flagged as an accidental fire event.

Figure 2E:
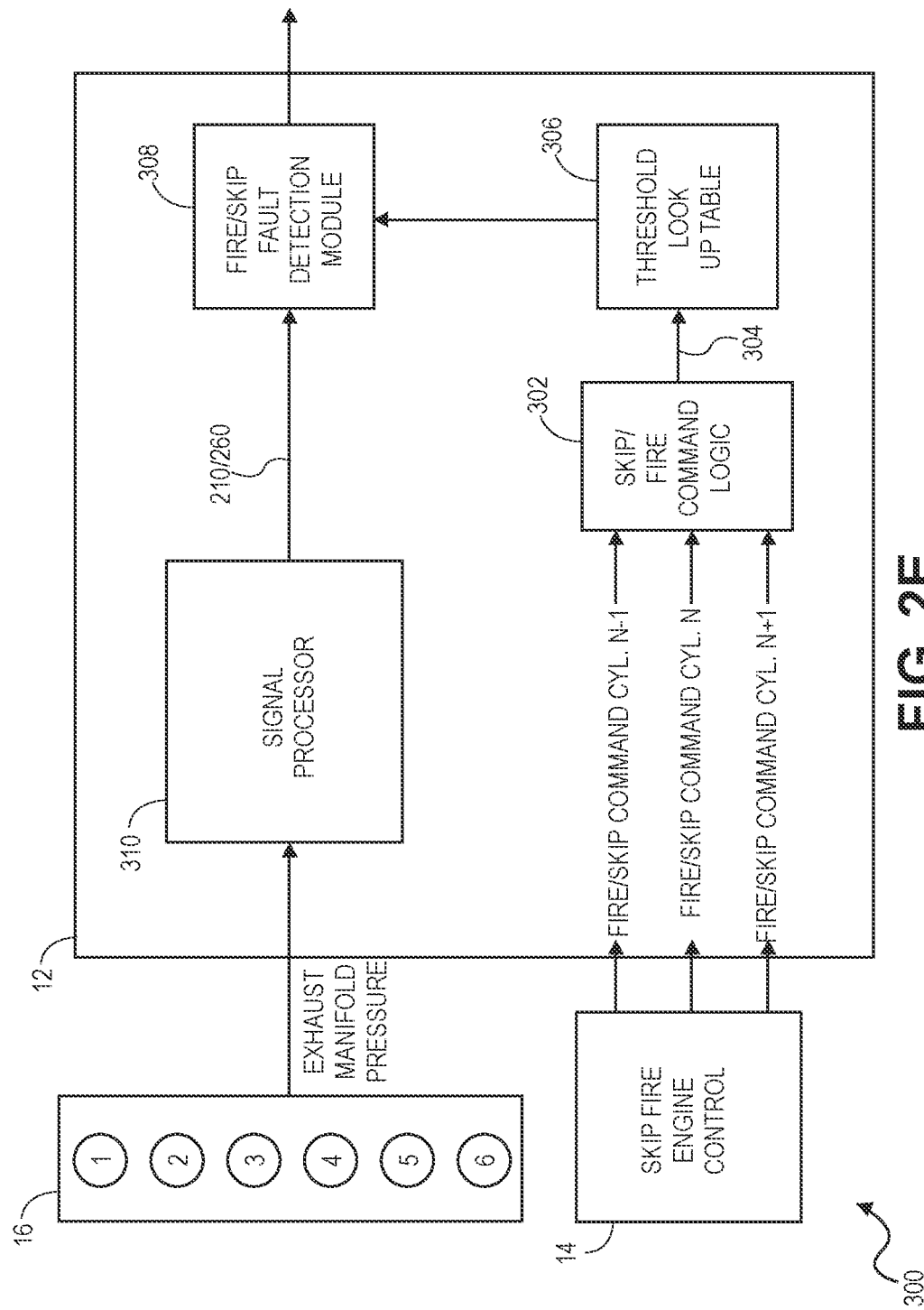
FIG. 2E is a logic diagram of an alternative fault detection system in accordance with another non-exclusive embodiment.

FIG. 2E is a diagram of alternative fault detection logic 300. In this particular embodiment, the fault detection logic 300 includes the fault detection system 12 which receives skip/fire commands for the individual cylinders (i.e., 1 through 6) of the internal combustion engine 16. In response, skip/fire command logic 302 generates a status signal 304 that is indicative of the skip or fire status of the cylinder N as well and the previous and next cylinders N−1 and N+1. In this non-exclusive embodiment, the status signal 304 is capable of assuming one of eight logical states for each of the cylinder events N−1, N and N+1 (i.e., $2^3=8$). It should be understood that either more or less cylinder events may be considered and used, and in which case, the status signal may assume either more or less than eight logical states.

Based on the status of the signal 304, a threshold lookup table 306 accesses a table of threshold values and provides a select threshold pressure value to the fault skip/fire detection module 308 that corresponds to the status of the signal 304. In this manner, the threshold pressure value is adjusted based on a combination of (a) if the command for cylinder N is either a fire or a skip and (b) if the previous and next firing events are a fire and/or a skip.

The signal processor 310 is responsible for generating the difference pressure signals 210/260 as discussed above from the "raw" exhaust manifold pressure reading 204/254. In response, the skip/fire detection module 308 compares for the cylinder N the received threshold with the difference pressure signal 210 or 260. In response, the skip/fire detection module 308 generates either (a) an unsuccessful fire fault if the cylinder N did not fire but should have or (b) an unsuccessful skip if the cylinder N event resulted in combustion but should have skipped.

The above process is repeated as the cylinders 1 through 6 of the internal combustion engine 16 are commanded to either fire or skip as they sequence in their order during each engine cycle. In this way, unsuccessful fires and/or unsuccessful skips can be flagged on an ongoing basis during operation.

Creating Exhaust Pressure Models Using Empirical Data

The applicant has discovered that empirical data can be used to construct fire and skip models that can be used by the fault detection system 12 to determine if commands to either fire or skip cylinders of the internal combustion engine 16 were successful or not.

Figure 3A:
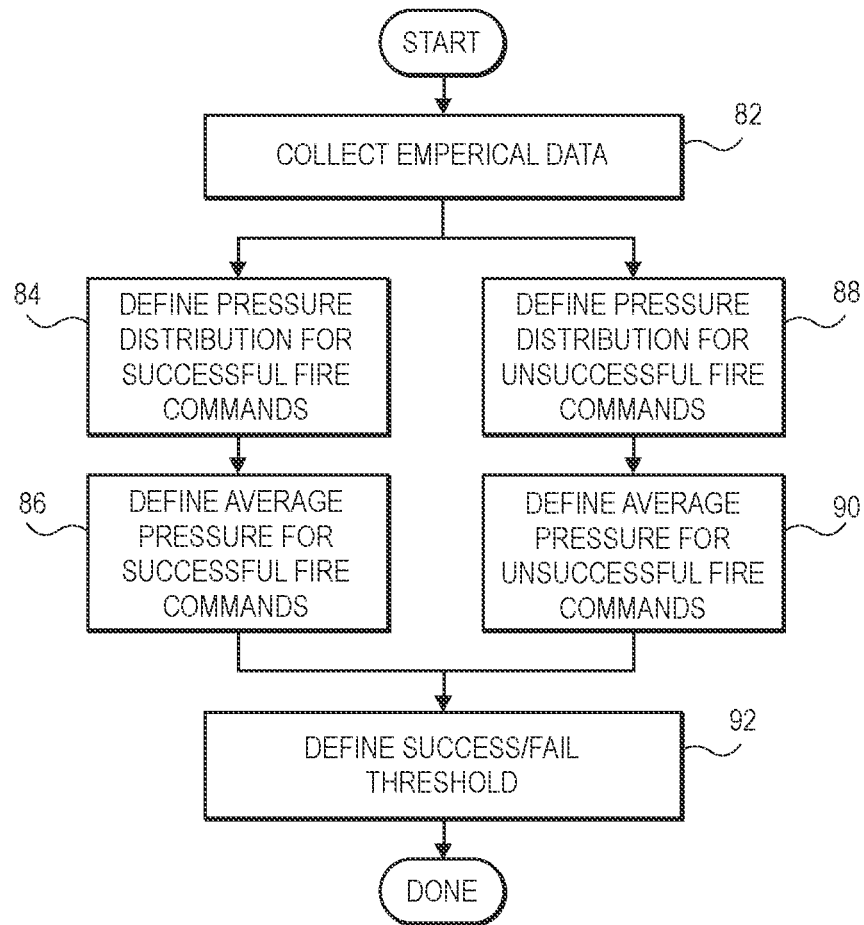
FIG. 3A is an exemplary flow diagram illustrating steps for developing a fire model in accordance with a non-exclusive embodiment of the invention.

Referring to FIG. 3A, an exemplary flow diagram illustrating steps for developing the fire model is illustrated.

In step 82, empirical data indicative of exhaust pressure readings for fired working cycles of the cylinders are collected.

In step 84, a first distribution range of exhaust pressures for successful cylinder firings is defined from the empirical data.

In step 86, an average exhaust pressure for successful cylinder firing is defined. In other words once the pressure readings from successful firings have been placed in the first distribution range, the average is calculated from those readings.

In step 88, a second distribution range of exhaust pressures for unsuccessful cylinder firings is defined from the empirical data.

In step 90, an average exhaust pressure for the unsuccessful cylinder firing is defined.

In step 92, a threshold between the two distribution ranges is defined.

Figure 3B:
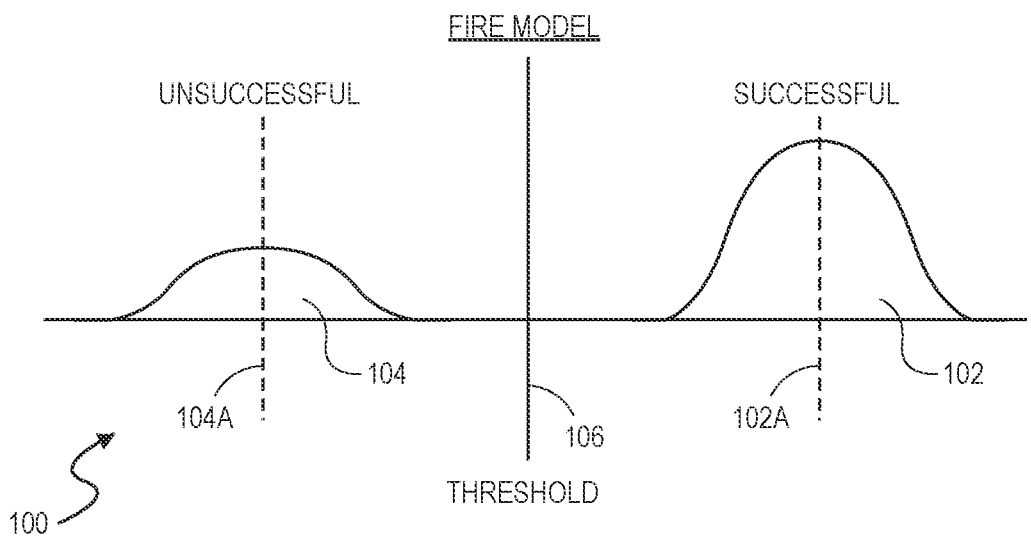
FIG. 3B is an exemplary fire model that shows distribution ranges for successful and unsuccessful cylinder firings and a threshold between the two in accordance with a non-exclusive embodiment of the invention.

Referring to FIG. 3B, an exemplary fire pressure distribution model 100 is illustrated. The distribution model 100 shows a first distribution range 102 for successful firings and an average exhaust pressure 102A for the successful firings. The distribution model 100 also shows a second distribution range 104 for unsuccessful cylinder firings and an exhaust pressure average 104A for unsuccessful firings. A threshold 106 is defined between the two ranges 102, 104.

The threshold 106 of the model 100, as defined in step 92, is used by the fault detection system 12 to make a determination if a fire command for a cylinder during actual operation of the internal combustion engine 16 was successful or not. If the measured exhaust pressure resulting from the fire command is above the threshold 106, then the fault detection system 12 determines that the fire command was successfully implemented. On the other hand if the measured exhaust pressure is below the threshold 106, then the fault detection system 12 determines that the fire command was unsuccessfully implemented by the cylinder.

The above described methodology for ascertaining the threshold 106 can be used regardless of which pressure sensor(s) 52, 54 and/or 56 are used. In the case of the latter (e.g., 54 or 56), the above methodology can be used to ascertain the threshold value 212 as discussed above.

Figure 4A:
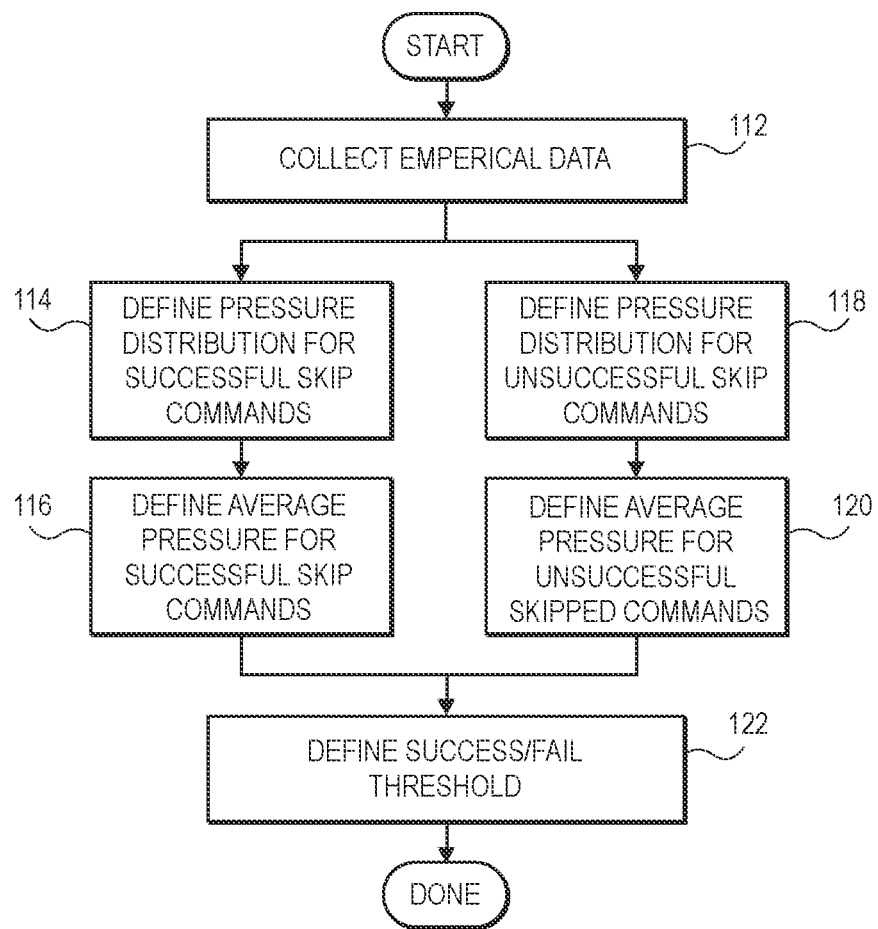
FIG. 4A is an exemplary flow diagram illustrating steps for developing a skip model in accordance with a non-exclusive embodiment of the invention.

Referring to FIG. 4A, an exemplary flow diagram illustrating steps for developing the skip model is illustrated.

In step 112, empirical data indicative of exhaust pressure readings for skipped working cycles of cylinders are collected.

In step 114, a first distribution range of exhaust pressures for successful cylinder skips is defined from the empirical data.

In step 116, an average exhaust pressure for successful cylinder skips is defined. In other words once the pressure readings from successful skips have been placed in the first distribution range, the average is calculated from those readings.

In step 118, a second distribution range of exhaust pressures for unsuccessful cylinder skips is defined from the empirical data.

In step 120, an average exhaust pressure for the unsuccessful skips of the cylinders is defined.

In step 122, a threshold between the two distribution ranges is defined.

Figure 4B:
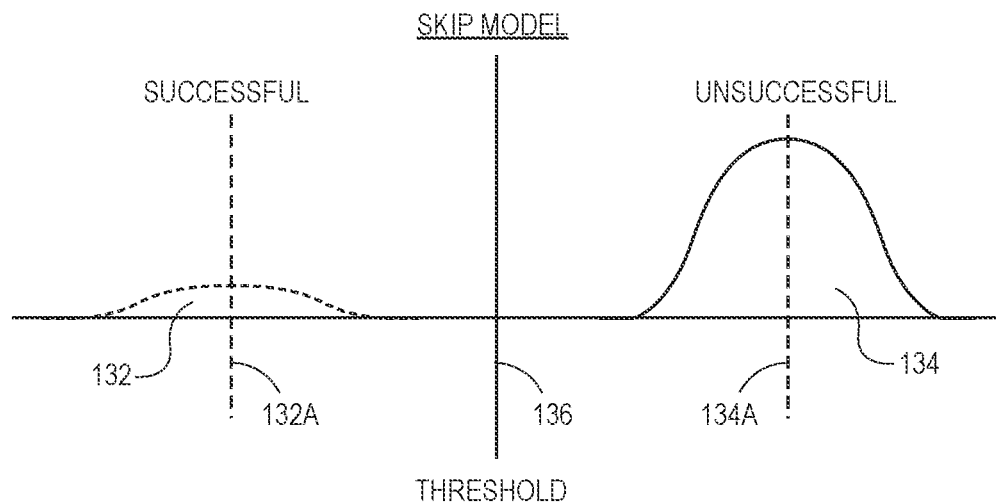
FIG. 4B is an exemplary skip model that shows distribution ranges for successful and unsuccessful cylinder skips and a threshold between the two in accordance with a non-exclusive embodiment of the invention.

Referring to FIG. 4B, a skip pressure distribution model 130 is illustrated. The distribution model 130 shows a first distribution range 132 for successful skips and an average exhaust pressure 132A for the successful skips. The distribution model 130 also shows a second distribution range 134 for unsuccessful cylinder skips and an exhaust pressure average 134A for the unsuccessful skips. The threshold 136 is defined between the two ranges 132, 134.

The threshold 136 of model 130, as defined in step 122, is used by the fault detection system 12 to make a determination if a skip command for a cylinder during actual operation of the internal combustion engine 16 was successful or not. If the measured exhaust pressure resulting from the skip command is below the threshold, then the fault detection system 12 determines that the skip command was successful. On the other hand if the measured exhaust pressure is above the threshold 136, then the fault detection system 12 determines that the skip command was unsuccessful.

The empirical data used to create the models 100, 130 may be collected a number of ways. For instance, the data can be collected from the internal combustion engine 16 or similar engines. As the data is collected, the various distribution ranges are updated and the averages defined. As a general rule, the more empirical data used the more complete and representative of real-world driving conditions the distributions 100, 130 will be. With this in mind, a large number of the exhaust pressure readings are typically used, typically in the range of at least tens of thousands or hundreds of thousands of samples, but many more or fewer samples may be used.

Once these distribution models 100, 130 are constructed, they are typically stored in location 50 where they are readily accessible by the fault detection system 12.

The above described methodology for ascertaining the threshold 136 can be used regardless of which pressure sensor(s) 52, 54 and/or 56 are used. In the case of the latter (e.g., 54 or 56), the above methodology can be used to ascertain the threshold value 262 as discussed above.

Creating Exhaust Pressure Models Using a Neural Network

Neural networks are computing systems that "learn" to perform tasks by considering examples, generally without being programmed with any task-specific rules. Common applications of neural networks include image recognition, speech recognition and natural language processing, With each application, the neural network "learns" from known examples of a subject and then automatically applies this learned knowledge to identify unknown examples of the same or similar subjects. For example, neural networks that learn from known examples of images, speech or natural language utterances learn to recognize unknown examples of images, speech and natural language utterances respectively. In a similar manner, the Applicant has found that a neural network can be used to (1) learn successful cylinder firings and successful cylinder skips from Measured exhaust pressure readings collected from empirical data. and (2) make determination if actual cylinder fire or skip commands were successful or not by comparing measured exhaust pressure readings from learned models of successful cylinder firings and successfully cylinder skips.

Figure 5:
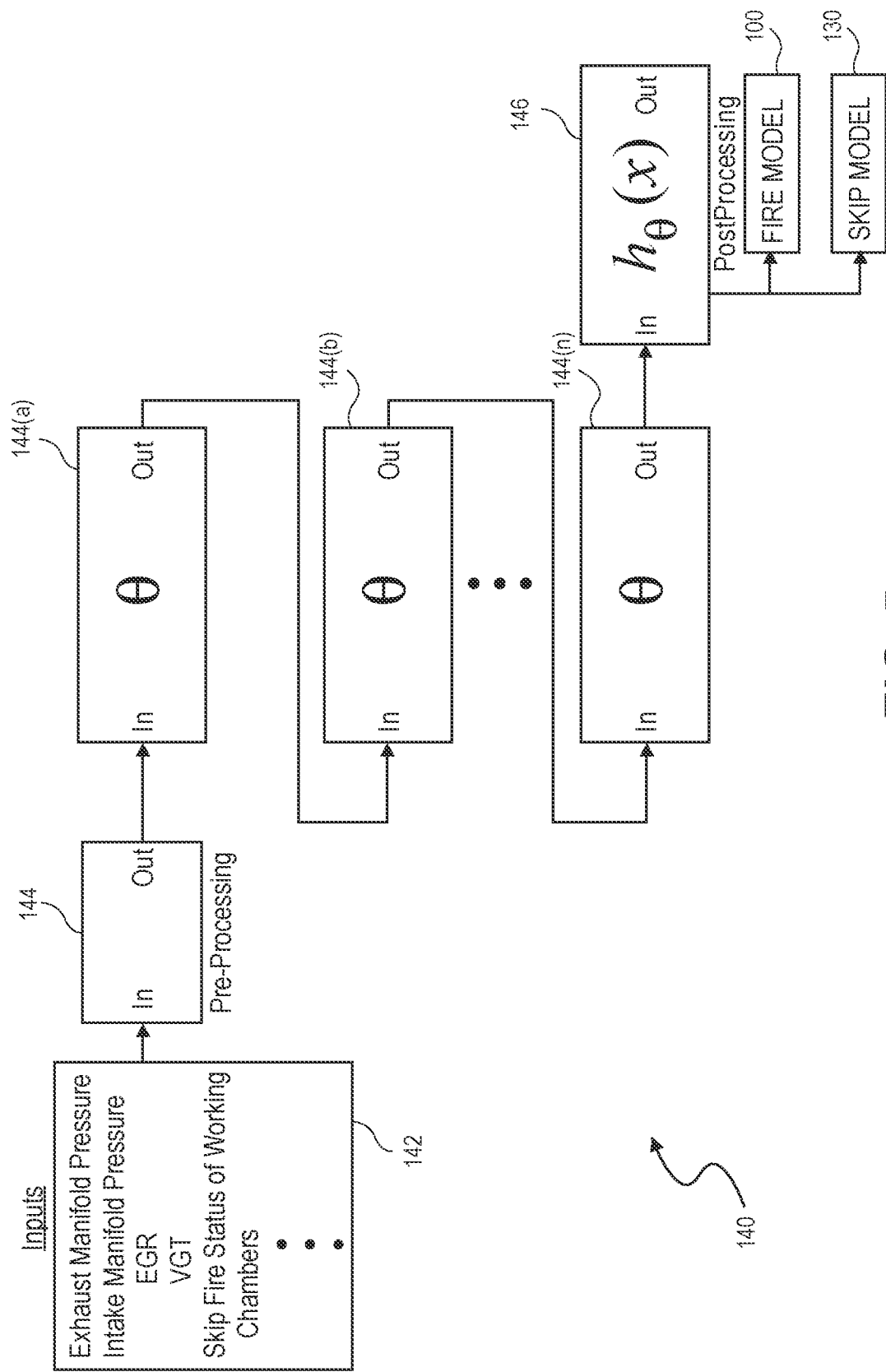
FIG. 5 is a block diagram of an exemplary neural network used in generating the fire model and the skip model in accordance with another non-exclusive embodiment of the invention.

Referring to FIG. 5, a neural network 140 that can be used for inferring whether any given firing opportunity is a fault based on the fire distribution model 100 and the skip distribution model 130 is shown.

The neural network 140 includes an input layer 142, an input pre-processing layer 144, one or more hidden layer(s) 144(*a*) through 144(*n*) and an output layer 146.

The input layer 142 is arranged to receive a number of inputs. In a non-exclusive embodiment, the inputs may include one or more of (a) exhaust pressure samples, (b) intake manifold pressure samples, (c) Exhaust Gas Recirculation (EGR) valve position samples, (d) Variable Geometry Turbo (VGT) vane position samples, (e) waste gate position samples, (f) a skip or fire status of each of one or more cylinders of the internal combustion engine, (g) engine speed, (h) cylinder load, and (i) measured pressure samples within the cylinders of the internal combustion engine. It should be understood that the list of inputs provided herein are exemplary and should not be construed as limiting. Fewer or more inputs can be used as well.

The input pre-processing layer 144 normalizes the inputs. By normalization, any inputs that are measured on different scales are adjusted to be measured on a common or similar scale.

Each of one or more hidden layers 144(a)-144(n) includes one or more processors ($\theta_1, \theta_2, \theta_3, \ldots \theta_N$) for implementing functions. Each of the hidden layers 144(a)-144(n) is arranged to receive inputs from previous layer and provide processed outputs to the next layer. For instance, the first hidden layer 144(a) receives the normalized inputs from the pre-processing layer 144 and provides processed outputs to the second hidden layer 144(b). The second hidden layer 144(b), after processing its inputs, provides its processed output to the next hidden layer 144(c). This process is repeated from each of the hidden layers.

The last hidden layer 144(n) processes its inputs and provides its output to the output layer 146, which may perform further post-processing. The net result of the output layer 146 is the fire distribution model 100 defining threshold 106 and skip distribution model 130 defining threshold 136, which again are maintained in the storage location 50 accessible by the fault detection system 12.

In the neural network shown, only three tiers of hidden layers 144(a), 114(b) and 114(n) are shown for the sake of simplicity. It should be understood that any number of hidden layers may be used.

The neural network 140 may be trained by collecting a large number of data points under a variety of test engine operating condition, such as, but not limited to, firing density, cylinder load, overall engine torque demand, turbocharger settings, exhaust gas recirculation settings, and engine speed. The test engine may have special instrumentation and control functions that are not on production engines. Valve faults are purposely introduced into the data by deliberately operating the intake or exhaust valve in a faulty manner on selected firing opportunities to replicate unsuccessful fires and skips. The neutral network 140 tracks exhaust pressure readings for both firing and skipped opportunities having deliberately induced faults and firing and skipped opportunities having correct valve actuation. Based on the gathered data, the neural network 140 learns which exhaust pressure readings correspond to faulty valve operation for both unsuccessful fires and skips and which firing opportunities correspond to proper valve operation for successful fires and skips. It should be appreciated that the neutral network 140 needs to know whether a firing opportunity is intended to be skipped or fired in determining whether the firing opportunity was correctly executed. Also, the neutral network 140 may need to know a skip fire pattern of firing opportunities prior to and after a test firing opportunity in determining whether the test firing opportunity was correctly executed.

Once a large data set of test points representing both correct and faulty valve operation is collected and analyzed by the neutral network 140, the neutral network may then be used to predict whether the valves on a given firing opportunity operated correctly. These predictions may be compared against data where once again the engine has deliberately introduced valve faults. If the training has been successful, the neural network 140 can accurately predict valve faults and the training is validated. If the neutral network 140 does not accurately predict valve faults it can be retrained until acceptable performance is achieved. The resulting algorithm can then be used in production engines as part of an on-board diagnostic (OBD) system and/or maintained in a storage location 50 that is accessible by the fault detection system 12.

Turbocharger and/or EGR Diagnostics

During operation of the internal combustion engine 16, the six cylinders 1-6 are operated in their predetermined sequence over multiple engine cycles. As the torque request for the engine 16 changes, the skip fire engine controller 14 makes a near instantaneous decision on the needed firing pattern or firing fraction required to meet the current torque demand and issues fire or skip commands to the individual cylinders 1-6 accordingly. Consequently, during continuous operation of the internal combustion engine 16, the exhaust pressure sensors 52, 45 and/or 56 see a string of pressure pulses having a frequency that coincides with combustion events of the cylinders respectively.

The Applicant has found that by averaging a string of pressure pulses over time (or the crank angle of the crankshaft of the engine 16), the filtered result can be used as a diagnostic tool to determine if either the waste gate 36 of the turbocharger 30 or the EGR valve 42 of the EGR system 40 are improperly operating.

Figure 6:
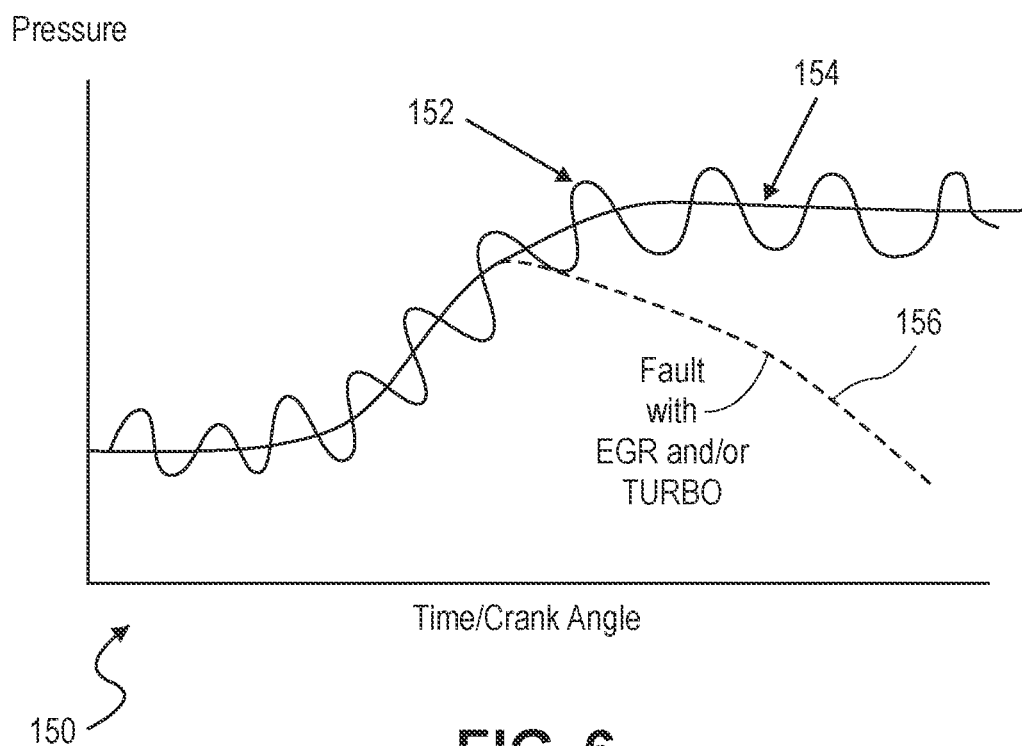
FIG. 6 is a plot illustrating a filtered exhaust pressure signals over multiple working cycles used for detection faults with an EGR system and/or turbo-charging system in accordance with non-exclusive embodiments of the present invention.

Referring to FIG. 6, a plot 150 is provided illustrating (a) a non-filtered signal 152 including a string of exhaust pressure pulses (as measured by any of the sensors 52, 54 or 56) generated by the cylinders 1-6 over the working cycles of multiple engine cycles and (b) a filtered signal 154 that is derived by averaging the pressure readings of the pulses of signal 152 over time. Stated another way, the signal 152 contains a high frequency component of the measured exhaust pressure fluctuations since the pulses occur at a high frequency rate that coincides with the frequency of the working cycles of the cylinders 16. This non-filtered signal 152 is used by the fault detection system 12 for diagnostics to determine if individual fire or skip commands were successfully implemented or not. In contrast, the filtered signal 154 contains low frequency components of the exhaust pressure readings because the high frequency components have been filtered out.

The Applicant has discovered that if there is a sudden drop in pressure of the filtered signal 154, it typically signifies that the there is a problem with either the waste gate 36 of the turbocharger 30 or the EGR valve 42. For example if the waste gate 36 and/or EGR valve properly close, then the pressure of the filtered signal 154 remains relatively high. On the other hand if the waste gate becomes stuck in the open position, then there will be a precipitous drop in pressure as most of the exhaust gases bypass the turbine 32. Similarly, if the EGR valve 42 is stuck in the open position, then a significant amount of the exhaust gases are re-circulated back into the intake manifold 18. Either way, the measured exhaust pressure typically drops precipitously. See for example signal 156 of FIG. 6, which shows a precipitous pressure drop, indicative of a malfunction of either the waste gate 36 or the EGR valve 42.

The fault detection system 12 performs diagnostics on the operation of the turbocharger 30 and EGR system 40. The fault detection system 12 compares the filtered signal 154 to a threshold for each system 30, 40. If the signal 154 falls below the threshold for either, then fault detection system 12 diagnoses that there is a problem with either the waste gate valve or EGR valve or potentially both.

Conclusion

The present embodiments should be considered illustrative and not restrictive and the invention is not to be limited to the details given herein, but may be modified within the scope and equivalents of the appended claims.

What is claimed is:

1. A method, comprising:
ascertaining if a cylinder of an internal combustion engine is commanded to fire or skip during a cylinder event;
comparing a measured exhaust pressure, associated with the cylinder event, with either:
(a) a first exhaust pressure threshold indicative of a successful or unsuccessful skip if the cylinder is ascertained as commanded to skip;
(b) a second exhaust pressure threshold indicative of a successful or unsuccessful fire if the cylinder is ascertained as commanded to fire; and
determining if the cylinder successfully skipped as commanded or successfully fired as commanded during the cylinder event based on the comparison of (a) or (b) respectively.

2. The method of claim 1, wherein the first exhaust pressure threshold and the second exhaust pressure threshold are derived from empirical data generated during multiple cylinder events during testing of the internal combustion engine or a similar internal combustion engine.

3. The method of claim 1, wherein the first exhaust pressure threshold is derived from average exhaust pressures for both unsuccessful skips and successful skips as measured during multiple cylinder events.

4. The method of claim 3, wherein defining the average exhaust pressures for both the unsuccessful skips and the successful skips further comprises:
defining exhaust pressure distributions for both unsuccessful and successful cylinder skips as measured during the multiple cylinder events; and
defining the average exhaust pressures for both the unsuccessful skips and the successful skips from the defined exhaust pressure distributions respectively.

5. The method of claim 1, wherein the second exhaust pressure threshold is derived from average exhaust pressures for both unsuccessful fires and successful fires as measured during multiple cylinder events.

6. The method of claim 5, wherein defining the average exhaust pressures for both the unsuccessful fires and the successful fires further comprises:
defining exhaust pressure distributions for both unsuccessful and successful cylinder fires as measured during the multiple cylinder events; and;
defining the average exhaust pressures for both the unsuccessful fires and the successful fires from the defined exhaust pressure distributions respectively.

7. The method of claim 1, wherein (a) further comprises determining if the measured exhaust pressure is either above or below the first exhaust pressure threshold which is located between a first distribution range of exhaust pressures for successful skips and a second distribution range of exhaust pressures for unsuccessful skips.

8. The method of claim 1, wherein (b) further comprises determining if the measured exhaust pressure is either above or below the second exhaust pressure threshold which is located between a first distribution range of exhaust pressures for successful firings and a second distribution range of exhaust pressures for unsuccessful firings.

9. The method of claim 1, further comprising training a neural network to define the first exhaust pressure threshold and the second exhaust pressure threshold.

10. The method of claim 9, wherein training the neural network to define the first exhaust pressure threshold and the second exhaust pressure threshold further comprises:
providing one or more inputs to an input layer of the neural network;
generating a first exhaust pressure model indicative of successful and unsuccessful skips and a second exhaust pressure model indicative of successful and unsuccessful fires by processing the one or more inputs in nodes of one or more hidden layers of the neural network; and
deriving, at an output of the neural network, the first exhaust pressure threshold and the second exhaust pressure threshold from the first exhaust pressure model and the second exhaust pressure model respectively.

11. The method of claim 10, wherein the one or more inputs are selected from:
exhaust pressure samples;
intake manifold pressure samples;
Exhaust Gas Recirculation (EGR) valve position samples;
Variable Geometry Turbocharger (VGT) vane position samples;
waste gate position samples;
skip or fire status signals of each of one or more cylinders of the internal combustion engine;
engine speed;
cylinder load; and
models of in-cylinder pressures during skipped working cycle and during fired working cycles.

12. The method of claim 1, further comprising using the measured exhaust pressure over multiple cylinder events to determine if fire commands and skip commands for a plurality of cylinders of the internal combustion engine are successfully executed or unsuccessfully executed respectively.

13. The method of claim 1, further comprising determining if there is a faulty operation of an Exhaust Gas Recirculation (EGR) system, which operates in cooperation with the internal combustion engine, based on if a pressure drop in a filtered version of the measured exhaust pressure over multiple cylinder events fails below a predetermined threshold.

14. The method of claim 1, further comprising determining if there is a faulty operation of a turbocharger system, which operates in cooperation with the internal combustion engine, based on a degree of a pressure drop of a filtered version of the measured exhaust pressure over the multiple cylinder events.

15. The method of claim 1, wherein the measured exhaust pressure is measured using one or more pressure measuring sensors located in one or more of the following:
(i) an exhaust runner fluidly coupling the cylinder to an exhaust manifold associated with the internal combustion engine;
(ii) within an exhaust manifold;
(iii) downstream of the exhaust manifold; or
(iv) any combination of (1) through (iii).

16. The method of claim 1, further comprising operating the internal combustion engine in one of the following:

a cylinder deactivation mode where a first group of cylinders are continually fired while a second group of cylinders are continually skipped while operating the internal combustion engine at an effective reduced displacement that is less than full displacement of the internal combustion engine;

a skip-fire manner such that at least one cylinder is fired, skipped and either fired or skipped over three successive working cycles while the internal combustion engine is operating at an effective reduced displacement that is less than full displacement of the internal combustion engine; or a dynamic skip fire mode where the decision to skip or fire cylinders is made on either a cylinder event-by-cylinder event basis or an engine cycle-by-engine cycle basis.

17. The method of claim 1, further comprising generating a diagnostic fault signal indicative if the cylinder either unsuccessfully fired or unsuccessfully skipped.

18. The method of claim 1, wherein the internal combustion engine is one of the following types of internal combustion engines:
a Diesel-fueled engine;
a gasoline-fueled engine;
a spark ignition engine; or
a compression ignition engine.

19. An engine control system configured to control operation of an internal combustion engine (ICE), the engine control system configured to:
(a) command cylinders of the ICE to skip during first cylinder events and fire during second cylinder events;
(b) compare first measured exhaust pressures associated with the first cylinder events to a first exhaust pressure threshold indicative of an unsuccessful skip respectively;
(c) compare second measured exhaust pressures associated with the second cylinder events to a second exhaust pressure threshold indicative of an unsuccessful fire respectively; and
(d) generate fault flags when the cylinders unsuccessfully skipped and unsuccessfully fired as commanded based on the comparisons of (b) and (c) respectively.

20. The engine control system of claim 19, further configured to generate a fault flag if a measured exhaust pressure for a given first cylinder event of a cylinder commanded to be skipped is above the first exhaust pressure threshold.

21. The engine control system of claim 19, further configured to generate a fault flag if a measured exhaust pressure for given second cylinder event of a cylinder commanded to be fired is below the second exhaust pressure threshold.

22. The engine control system of claim 19, wherein the first exhaust pressure threshold and the second exhaust pressure threshold are maintained in storage locations accessible by the engine control system and are periodically updated using machine learning.

23. The engine control system of claim 19, wherein the first exhaust pressure threshold and the second exhaust pressure threshold are derived from empirical data collected from multiple firings and multiple skips of the cylinders of the ICE or a similar ICE.

24. The engine control system of claim 19, wherein the first exhaust pressure threshold and the second exhaust pressure threshold are derived from a neural network arranged to receive one or more inputs, the one or more inputs including:
exhaust pressure samples;
intake manifold pressure samples;
Exhaust Gas Recirculation (EGR) valve position samples;
Variable Geometry Turbocharger (VGT) vane position samples;
waste gate position samples;
skip or fire status of each of the cylinders of the internal combustion engine;
engine speed samples;
cylinder load samples; and
pressure samples within the cylinders.

25. The engine control system of claim 19, wherein the measured exhaust pressure is measured using one or more pressure measuring sensors located in one or more of the following:
an exhaust runner fluidly coupling a cylinder to an exhaust manifold associated with the internal combustion engine;
within an exhaust manifold;
downstream of the exhaust manifold; or
any combination of (a) through (c).

26. The engine control system of claim 19, wherein the ICE is one of the following types of internal combustion engines:
a Diesel-fueled engine;
a gasoline-fueled engine;
a spark ignition engine; or
a compression ignition engine.

27. The engine control system of claim 19, further configured to operate the ICE in one of the following:
a cylinder deactivation mode where a first group of cylinders are continually fired while a second group of cylinders are continually skipped while operating the ICE at an effective reduced displacement that is less than full displacement of the ICE;
a skip-fire mode such that at least one cylinder is fired, skipped and either fired or skipped over successive working cycles while the ICE is operating at an effective reduced displacement that is less than full displacement of the ICE; or
a dynamic skip fire mode where the decision to skip or fire cylinders is made on either a cylinder event-by-cylinder event basis or an engine cycle-by-engine cycle basis.

28. A fault detection method comprising setting a diagnostic fault flag if a filtered exhaust pressure signal, measured over multiple cylinder events of an internal combustion engine, falls below a threshold exhaust pressure.

29. The fault detection method of claim 28, wherein the filtered measured exhaust pressure signal is derived by averaging the measured manifold exhaust pressure signal over the multiple cylinder events.

30. The fault detection method of claim 28, wherein the diagnostic fault signal is indicative of one of the following:
(a) faulty operation of a waste gate valve of a turbocharger system;
(b) faulty operation of a variable geometry subsystem of a turbocharger system;
(c) faulty operation of an EGR valve of an EGR system; or
(d) any two or more of (a) through (c).

* * * * *